No. 675,200. Patented May 28, 1901.
H. L. DIXON.
GLASS MELTING AND BLOWING FURNACE.
(Application filed Sept. 28, 1900.)
(No Model.) 2 Sheets—Sheet 2.
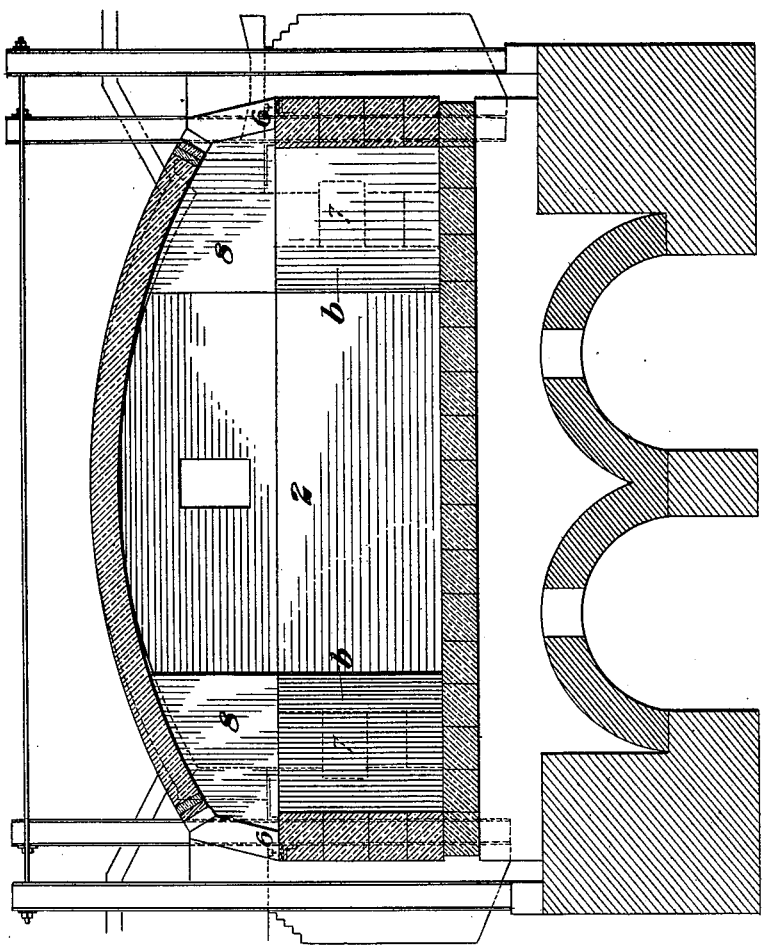
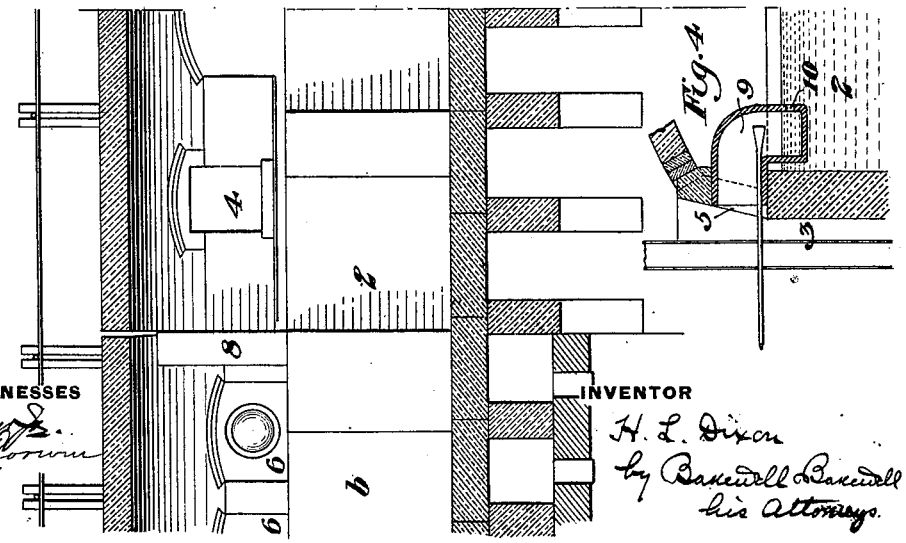
WITNESSES
INVENTOR
H. L. Dixon
by Bakewell & Bakewell
his Attorneys.
THE NORRIS PETERS CO., PHOTO-LITHO., WASHINGTON, D. C.

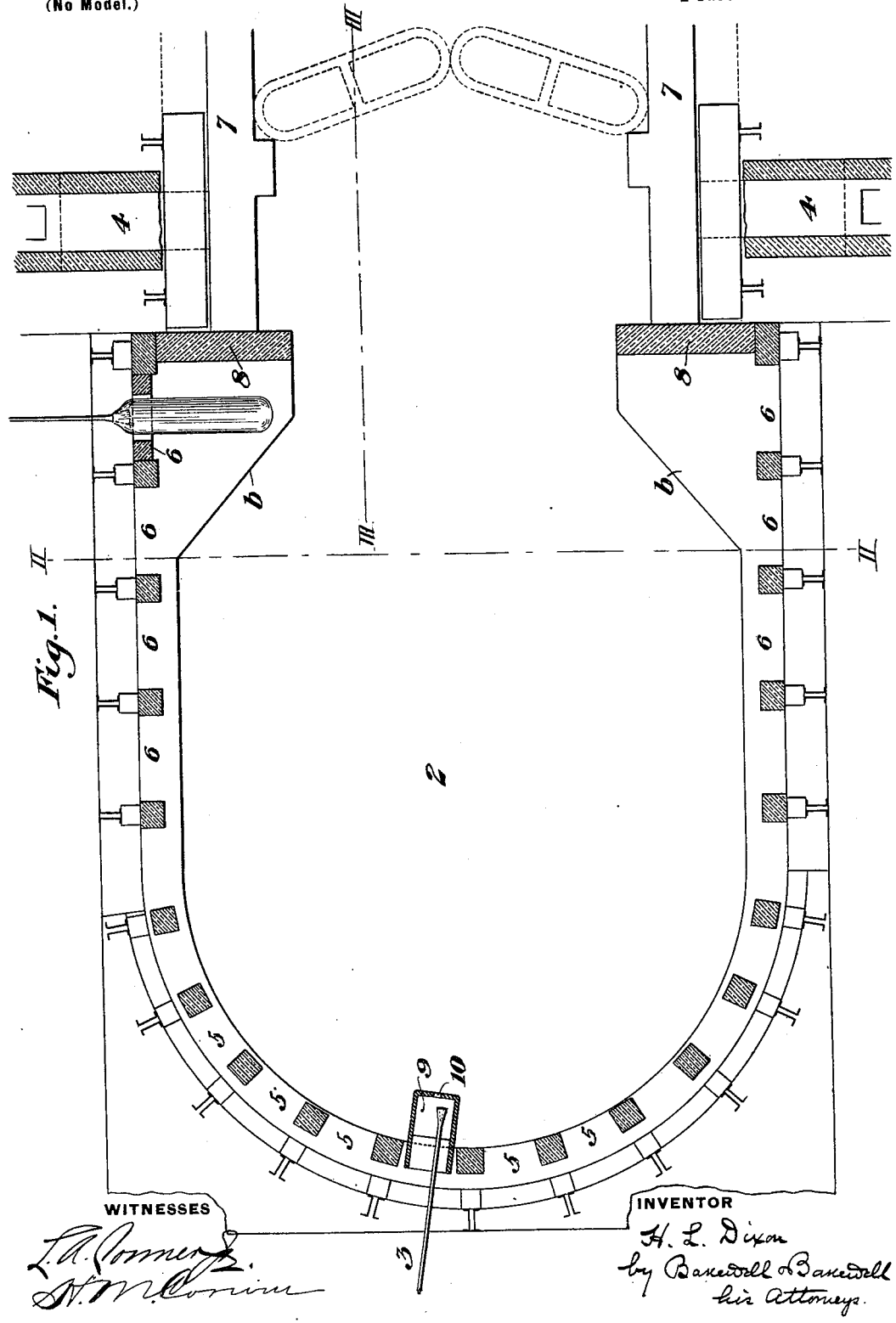

UNITED STATES PATENT OFFICE.

HENRY L. DIXON, OF PITTSBURG, PENNSYLVANIA.

GLASS MELTING AND BLOWING FURNACE.

SPECIFICATION forming part of Letters Patent No. 675,200, dated May 28, 1901.

Application filed September 28, 1900. Serial No. 31,360. (No model.)

*To all whom it may concern:*

Be it known that I, HENRY L. DIXON, of Pittsburg, in the county of Allegheny and State of Pennsylvania, have invented a new and useful Improvement in Glass Melting and Blowing Furnaces, of which the following is a full, clear, and exact description, reference being had to the accompanying drawings, forming part of this specification, in which—

Figure 1 shows in horizontal section a glass-melting furnace constructed in accordance with my invention. Fig. 2 is a vertical cross-section on the line II II of Fig. 1. Fig. 3 is a vertical longitudinal section of a part of the furnace on the line III III of Fig. 1. Fig. 4 is a sectional detail view.

The object of my invention is to provide efficient means which will enable glass-melting tanks in window-glass establishments to be used not only for melting the glass, but for heating the cylinders or rollers during the progress of their manufacture, and thus to make it unnecessary to employ separate heating-furnaces and to incur the expense and inconvenience which the employment of such furnaces would entail. By successfully accomplishing this result I save ground-space in the factory, effect an economy of fuel and apparatus, and generally expedite and cheapen the manufacturing operations.

In the drawings, 2 represents a melting-tank, one end 3 of which is used for gathering the glass, while the other end is employed for receiving and melting the glass bath, a gas-flame being passed for this purpose across the tank from a series of regenerator-ports 4 4.

5 5 are ports or openings at the end of the tank, at which the workmen gather the glass to be blown. The larger holes or openings at which the cylinders are heated by the blower are indicated at 6 6, being formed in the side walls of the tank and a sufficient number being provided for the purpose. This side wall is not continuous with the side walls 7 7 of the portion of the tank in which the glass is melted, but is set back from the line thereof, so as to afford a continuous chamber at the gathering end of greater width than the chamber at the melting end of the tank, and there are intermediate cross-walls 8 8, which extend to the roof and constitute shields, which protect the openings 6 6 from the direct heat of the flame in the melting portion of the furnace. The lower portions of the side walls at the end of the gathering portion of the tank are formed at an angle, as at *b b*.

When the cylinders are to be heated at the openings 6 in the course of their manufacture, the blower, standing at the side of the furnace, inserts his pipe, bearing the glass cylinder through one of the openings, and it is there heated by radiation from the roof and walls of the tank and from the molten glass, but is shielded by the walls 8 from the direct action of the flame in the melting-chamber. The consequence is that the glass cylinders will be heated uniformly and properly, whereas if it were not for the protection afforded by the walls the glass cylinders introduced at the openings next to the melting end of the furnace would be apt to be overheated and in some cases, as if the gas should be unexpectedly reversed in the generators, to be so much overheated as to drop from the blowpipe and be lost.

By my invention I render practicable the heating of the cylinders at the melting-tank and render such heating easy to effect and safe, whereas if the cylinders were heated in the furnace without the protection of a shield the operation would be an impracticable one.

Another feature of my invention consists in providing means whereby the pipes on which the glass is gathered can be heated preliminary to the introduction into molten glass. This heating is necessary in order to bring the gathering end of the pipe approximately to the temperature of the molten glass, so that the glass will adhere to the pipe, and during such heating the cold lumps of glass remaining on the pipe from previous gatherings are apt to crack and fly when introduced into the furnace, and thus to interfere with the gathering operations and spoil the glass. To provide for this, I place opposite to one or more of the openings 5 a boot or chamber 9, preferably made in the form of a pot, having an open end which registers with the opening 5. This boot extends down into the molten glass and has one or more holes 10, which enable the molten glass to flow into it and to remain therein at the same level as in the tank. When the pipe is to be heated, the workman introduces its gathering end into the boot, as shown in Fig. 4, and allows it to remain therein for a sufficient length of time. It is there heated by radiation from the molten glass contained in the boot, and if the chilled glass on the pipe should splinter and fly it will not interfere with the gathering operations, but will simply melt with and be absorbed by the body of molten glass contained in the boot.

Within the scope of my invention changes may be made in the form and construction of the parts, since

What I claim is—

1. A glass-melting furnace having a tank portion, a gathering-end portion of greater width than the tank portion and connected thereto to receive heat, and shields or walls at the juncture of the gathering and melting or tank portions, and extending downwardly from the roof to a point intermediate of the height of the furnace, said shield projecting inwardly beyond the side walls of both the melting and gathering portions of the furnace, said gathering-end portion having openings near the shields for the insertion of cylinders; substantially as described.

2. A glass-melting tank having a gathering-end portion of greater width than the tank portion, and joined to it by offset portions comprising side-wall extensions projecting inwardly and extending from the bottom up to a level intermediate the height of the furnace, and shielding-walls carried on said side-wall extensions and extending to the roof, these shields projecting inwardly beyond the side walls of both the melting and gathering portions of the tank, said gathering-end portion having openings near the shields for the insertion of cylinders; substantially as described.

In testimony whereof I have hereunto set my hand.

HENRY L. DIXON.

Witnesses:
H. M. CORWIN,
L. M. REDMAN.